United States Patent [19]

Doyle

[11] 4,355,470

[45] Oct. 26, 1982

[54] EQUATORIAL SUNDIAL

[76] Inventor: Timothy E. Doyle, 1010 Bell Ave., New Haven, Ind. 46774

[21] Appl. No.: 224,432

[22] Filed: Jan. 12, 1981

[51] Int. Cl.³ .................... G01C 17/34

[52] U.S. Cl. .................... 33/270

[58] Field of Search .................... 33/270; D10/45

[56] References Cited

U.S. PATENT DOCUMENTS

| | | | |
|---|---|---|---|
| 281,527 | 7/1883 | Larsen | 33/270 |
| 849,683 | 4/1907 | Hewitt | 33/270 |
| 4,135,357 | 1/1979 | Ashton | 33/270 |

FOREIGN PATENT DOCUMENTS

| | | | |
|---|---|---|---|
| 931161 | 2/1948 | France | 33/270 |

*Primary Examiner*—Willis Little

*Attorney, Agent, or Firm*—Gust, Irish, Jeffers & Hoffman

[57] ABSTRACT

An equatorial sundial according to this invention includes a dial surface and an elongated, rod-like gnomon fixedly secured in operative relation thereto. The dial surface is generally semi-cylindrical and concave toward the sun. The circumferential portion of the surface is further formed in the shape of a partial helix. The gnomon lies on the axis of the dial surface such that the longitudinal extent of the surface is transverse of the gnomon at an obtuse angle thereto. In a given geographical location, the sundial is so oriented relative to the earth that the gnomon is parallel to the earth's axis of rotation. With a proper pitch of the helical form of the dial surface, the opposite end portions thereof are offset in a direction parallel to the axis of the gnomon so that neither shade the dial surface either in the morning or evening.

14 Claims, 6 Drawing Figures

EQUATORIAL SUNDIAL

BACKGROUND OF THE INVENTION

1. Field of the Invention

The present invention relates to sundials and more particularly to equatorial sundials employing an upwardly concave dial surface exposed toward the sun and an elongated, rod-like gnomon extending parallel to the earth's axis of rotation.

2. Description of the Prior Art

Sundials have been used from time immemorial for the purpose of telling local time and have been embodied in various designs and configurations which provide a time-indicating shadow on the dial surface calibrated in increments of time, such as hours. Such sundials conventionally employ a gnomon set with respect to the dial surface, such a surface usually being a flat plane having markings corresponding to hours of the day. Equatorial sundials are well known, these employing a gnomon set to parallel the earth's axis of rotation and which is affixed to the central portion of a dial plate which is at right angles thereto. Hour lines on the dial plate radiate from the gnomon much in the same pattern as spokes of a wheel.

For more information regarding the prior art, reference is made to a book entitled "Sundials Their Theory and Construction" by Albert E. Waugh, copyrighted in 1973.

SUMMARY OF THE INVENTION

The present invention relates to an equatorial sundial which comprises a dial surface and an elongated, rod-like gnomon fixedly secured in operative relation thereto. The dial surface is concave upwardly, developed from a flat plane about a given axis. The gnomon parallels the axis with the dial surface between its ends extending transversely of the gnomon at an obtuse angle. The opposite end portions of the dial surface are thus offset in a direction parallel to the axis such that shading of the dial surface is avoided during both the morning and evening hours. More specifically, the dial is so oriented that the gnomon parallels the earth's axis of rotation, the dial surface is part cylindrical and further is shaped as a helical portion of a cylinder. Evenly spaced parallel hour lines extend transversely of the surface. At least one solar date and time-correction bead is provided on the gnomon in shadow-casting relation to the dial surface, and at least one elongated, combination calendar and time-correction chart is transversely arranged on the dial surface in operative registry with the shadow of the aforesaid bead. The chart includes time-correction indicia spaced along the longitudinal extent thereof which provides information in accordance with the equation of time. The chart further is divided into spaced length segments corresponding to different months of the year. The chart data is so oriented with respect to the bead on the gnomon as to provide a display of the month and day of the year as well as a time-correction factor required for the purpose of converting local apparent time as determined by the gnomon shadow into standard time.

In accordance with the foregoing, it is an object of this invention to provide an equatorial sundial which is of simple design, has no moving parts and is durable.

It is another object to provide such a sundial which displays the day of the year and a time correction factor for obtaining local standard time.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 3:
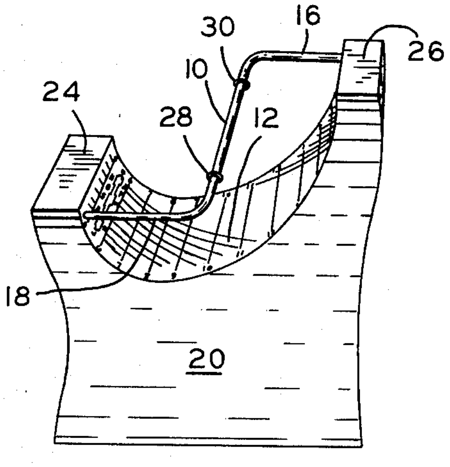
FIG. 3 is a perspective view of a working embodiment.

Referring to the drawings, the equatorial sundial of this invention comprises essentially two parts, a rod-like gnomon 10 and a semi-cylindrical dial surface 12 (the dial surface may be other than 180° of arc and this is intended to be included within the meaning of semi-cylindrical). The dial surface 12 has an axis 14 with which the axis of the gnomon 10 coincides. Referring to FIG. 3, the gnomon has oppositely extending end portions 16 and 18 which are secured at the extremities thereof to a rock carving 20 having the dial surface 12 thereon. Preferably, the gnomon extensions 16 and 18 are secured to the opposite end portions, respectively, of the dial surface 12 as shown. However, it will be apparent that the gnomon 10 may be secured in different ways relative to the dial surface 12 so long as it coincides with the axis 14. In a working embodiment, the radius of curvature of surface 12 is eighteen inches.

Figure 1:
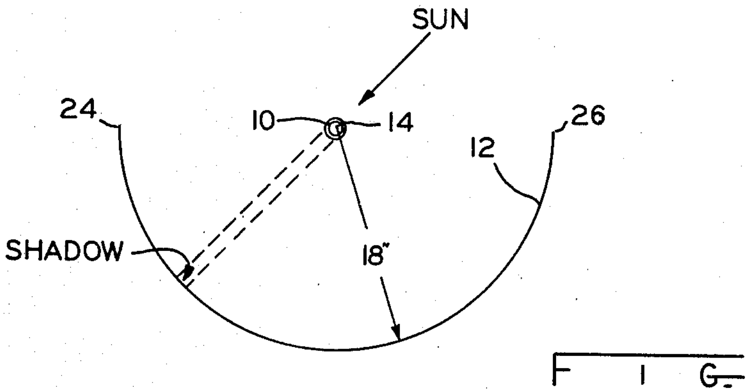
FIG. 1 is a diagrammatic end view of one embodiment of this invention.
Figure 2:
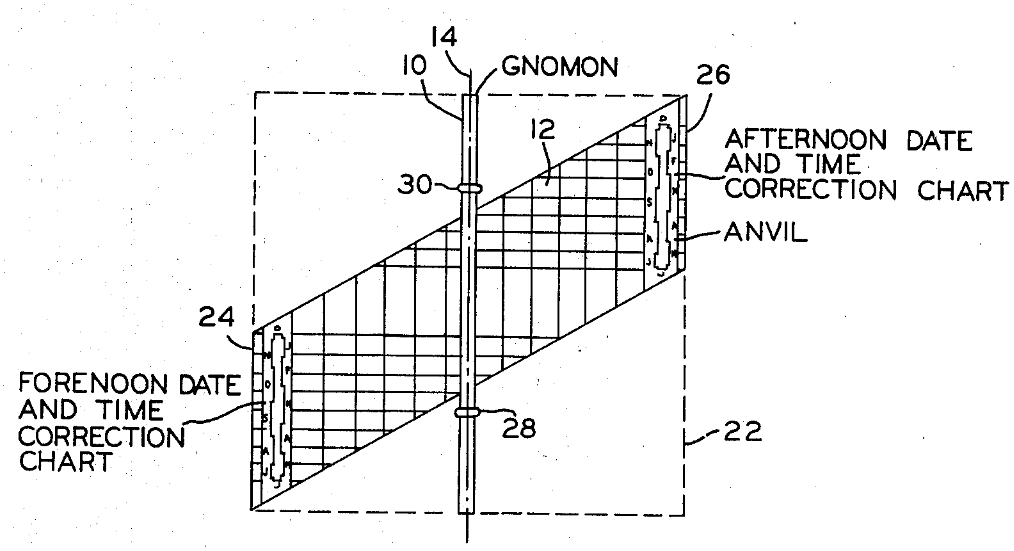
FIG. 2 is a top plan view thereof.

In FIG. 2, the dashed lines 22 outline the shape of a half cylinder within which the dial surface 12 lies. As noted, the dial surface 12 extends diagonally from one edge of the outline to the other. More particularly, this diagonal is intended to coincide with a portion of a helix of such cylinder for a purpose which will become apparent from the description that follows.

In order to tell time in a particular locality, it is necessary to orient the sundial relative to the sun. This is accomplished by positioning the dial such that the gnomon 10 extends parallel to the earth's axis of rotation. This may be accomplished by sighting the North Star along the length of the gnomon 10. So oriented, the dial surface 12 is concave upwardly with the opposite end portions 24 and 26 thereof defining a plane parallel to the gnomon 10 and furthermore perpendicular to a plane defined by the gnomon 10 and the earth's axis of rotation.

Two beads 28 and 30 are provided on the gnomon 10 in such positions as to cast shadows on the dial surface 12. The method of locating these beads on the gnomon will be explained later.

Figure 4:
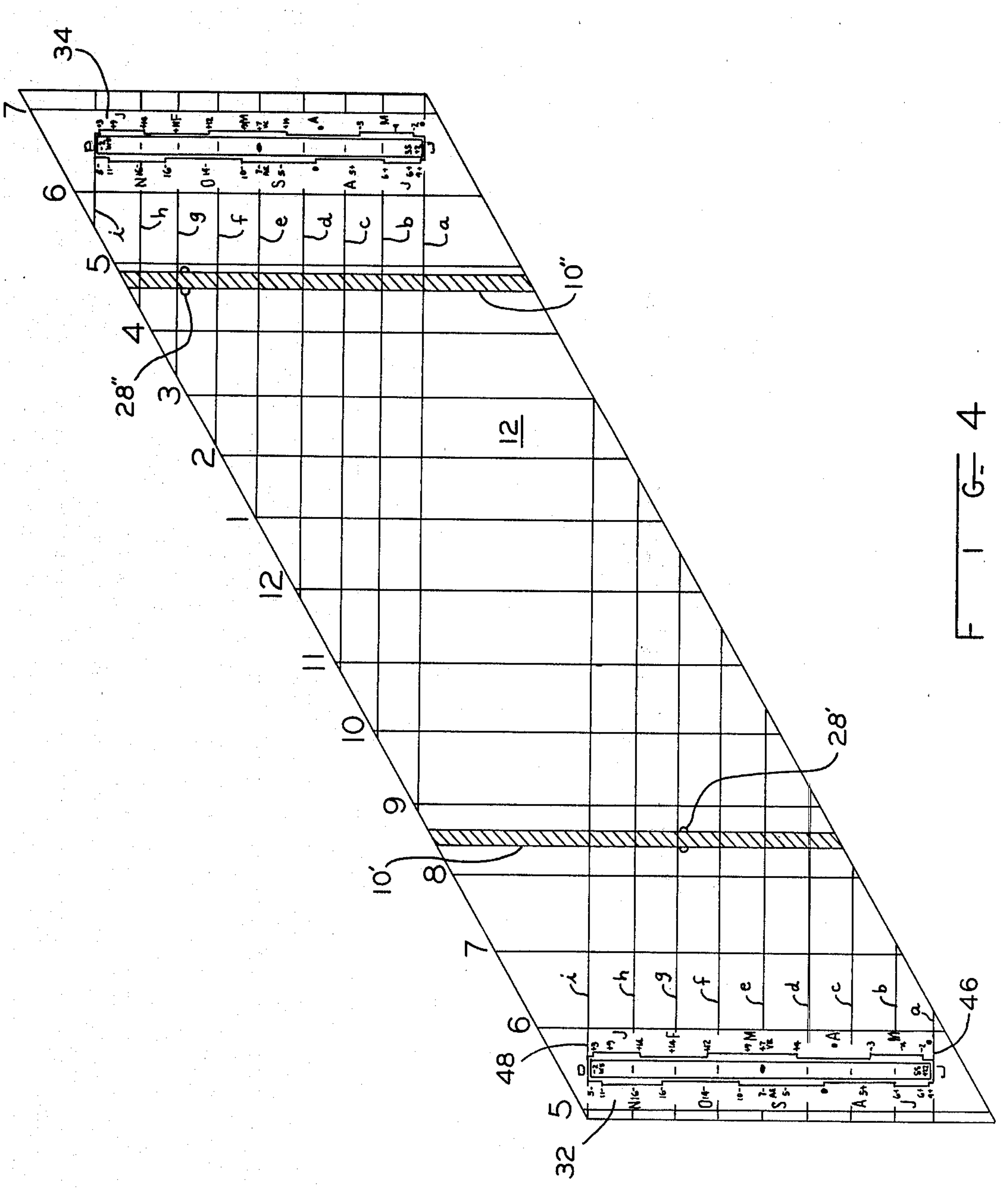
FIG. 4 is a plan view of the dial surface developed into a flat plane.

FIG. 4 shows the hour line markings on the dial surface 12, these being in the form of straight lines parallel to the gnomon 10 and extending transversely of the surface 12. These lines are spaced apart by intervals of one hour or fifteen degrees (15°) of arc, the hour lines for the afternoon extending from the twelve o'clock noon line to seven o'clock in the evening, those for the forenoon extending from five o'clock to the noon hour line. Another series of lines at right angles to the hour lines are imprinted on the dial surface 12, these being in two groups denoted by the letters "a" through "i" and "a'" through "i'". These two groups of lines are spaced apart and parallel and may be of any suitable number as will appear from the following.

In setting up the sundial in a locality on a standard time meridian, the noon hour line must coincide with the center of the gnomon shadow when the sun is directly overhead or at a position in which the earth's axis of rotation and the meridian of the sundial location lie in a common plane with the sun. For each hour deviation from noon, another hour line is struck along the center line of the gnomon shadow.

In setting up the sundial in localities other than on standard time meridian, for the noon hour as determined by means of a clock, the center of the gnomon shadow on the dial face is observed and a line struck marking the noon hours. Other hour lines may likewise be determined.

Alternatively, the hour lines may be determined mathematically as known by persons skilled in the art.

Figure 5:
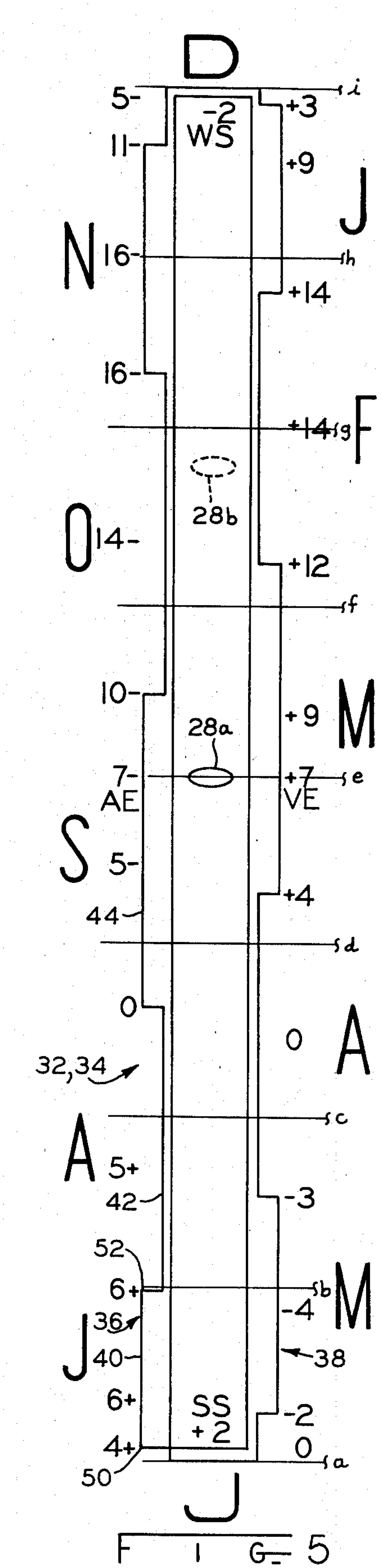
FIG. 5 is a view of the combination calendar and time-correction chart in enlarged form, which is imprinted on the opposite end portions of the chart of FIG. 4.

On the opposite extremities of the dial surface 12 and disposed between the respective lines "a", "i" and "a'," "i'," are two charts indicated generally by the numerals 32 and 34 which are identical and as shown in FIG. 5. Referring to FIG. 5, the chart is elongated and has two parallel, spaced sides 36 and 38. Each of these sides is divided into length segments, one segment for each month of the year. These segments are stepped as shown so as to provide a clear demarcation between months. Thus, the month of July is indicated by the line 40, the month of August by the line 42, the month of September by the line 44, and so on. The opposite ends of the chart denote portions of the months of June and December, respectively. Then on the opposite side 38 of the chart, the various line segments denote the months of January through May. The lengths and locations of these line segments are empirically determined either by the use of trigonometry or the actual location of bead shadows as explained later.

Also provided on the sides 36 and 38 are numbers denoting time-correction factors, these numbers corresponding to the equation of time as explained by Waugh in his book "Sundials Their Theory and Construction". This chart of FIG. 5 is to scale with the grid lines "a" through "i" being noted thereon. With the beads 28 and 30 properly located on the gnomon 10 in relation to the respective charts 32 and 34, at the time of the vernal and autumnal equinoxes, a shadow of the bead 28 during the forenoon hours would fall on line "e" of the dial surface 12. In other words, during daylight on March 21st and September 21st, the bead shadow would fall directly on the line "e" which is otherwise denoted in FIG. 5 by the shadow symbol 28*a*. Similarly, in the afternoon hours, the shadow from the bead 30 will track along the line "e" and occupy the same relative position on the chart 34 as denoted by the numeral 28*a*.

Figure 6:
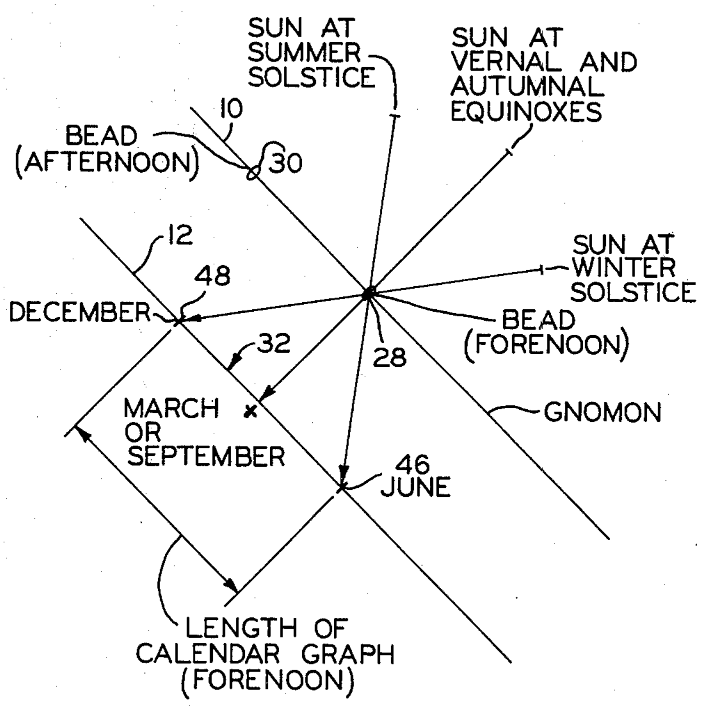
FIG. 6 is a diagrammatic illustration used in explaining certain features of this invention.

The parameters of the chart of FIG. 5 and the dial surface are further explained by the diagram in FIG. 6. Like numerals indicate like parts. The dial surface 12 must have sufficient width to accommodate the angular displacement of the sun north and south of the equator between the extremes of summer and winter solstices. With the sun at summer solstice, a shadow of the bead 28 is cast on the dial surface 12 at grid position 46. This corresponds to the date of June 21st. Similarly, at winter solstice, the bead 26 casts a shadow at grid point 48 corresponding to December 21st. Thus the minimum width of the dial surface 12 is determined as well as the precise length of the chart 32, 34.

Since the displacement of the sun relative to the equator is known for the beginning and end of each month, the location of the bead shadow relative to the length of the chart can easily be determined. For example, if one wished to design a chart in this manner, on the first of July the location of the shadow of the bead 28 on the surface 12 would be noted, this coinciding essentially with grid or date line "a". A mark could be thus noted on the chart at the point 50. Then at the end of July, a similar reading could be taken, noting that the shadow falls on date line "b" thereby determining the end 52 of the July line 40. Each month could then be charted the same way, but since this would be quite time consuming, one may simply use trigonometric functions based upon known solar displacement and plot the month locations.

From the well known "equation of time," time-correction factors are noted on the chart at frequent enough intervals to provide convenient reading. It is well known that sundials do not provide readings directly in local standard time but instead display "sun time" otherwise referred to as "local apparent time". The reasons for this is that, first the length of the day is not precisely twenty-four hours in duration, and secondly, standard time is measured only on one meridian for each fifteen degrees (15°) of longitude. The length of day varies by as much as thirty seconds on any given day such that in November as the result of this cumulative effect the sundial will read sixteen minutes faster than clock time and in February fourteen minutes slower. On days in between, it varies between these two extremes.

It will now be noted the purpose of the charts 32 and 34 is to provide an indication of the day of the year as well as the number of minutes to be added or substracted from the sun time in order to obtain local standard time.

Reading the sundial is as follows. Viewing FIG. 4, a particular shadow of the gnomon 10 is indicated by the numeral 10', the bead 28 by the shadow 28'. Noting that the center line of the shadow 10' is precisely midway between the forenoon hour lines 8 and 9, the sun or local apparent time is precisely 8:30. Then, moving left from the bead shadow 28' parallel to the date line "g," it will be noted that the chart 32 is intersected roughly along a line denoted by the imaginary bead shadow 28*b*. Knowing that it is the fall of the year, one now knows that the month is October. Considering the chart line of October to be linear, the actual date may be interpolated as being October 22nd. The time correction factor for the month of October varies between minus fourteen and minus sixteen minutes, and since the location of the bead shadow is about halfway between, it may be estimated that the time correction is −15 minutes. This time correction factor subtracted from the 8:30 reading provides an accurate standard time reading of 8:15 a.m. Similarly, for an afternoon reading, assuming that the gnomon casts a shadow 10'', a bead shadow 30' is also cast from bead 30. The center line of the shadow 10'' indicates about 4:45 p.m. The bead shadow 30' tracted toward the right parallel to the line g' occupies the same location on the chart 34 as the bead shadow 28' in the forenoon. The same date of October 22nd may thus be read and the time correction of −15 minutes when subtracted from the 4:45 reading provides an actual standard time of 4:30 p.m.

It is important that all readings be made from the centers of the shadows and the lines. The gnomon itself is preferably a stainless steel rod 1 3/16 inch in diameter. This width casts a shadow of the same width which is about 15 minutes wide. Each shadow edge is thus 7½ minutes from the center line. Thus the sun time may be interpolated with substantial accuracy. As explained in the preceding and illustrated in FIGS. 2 and 4, the dial surface 12 follows the path of a half-cylindrical helix. The pitch of the helix is made such that the opposite end portions of the dial surface 12 will be offset in a direction parallel to the gnomon 10 by an amount which prevents either end portion 24 or 26 from casting a shadow on another portion of the dial surface in both the morning and evening. This permits the use, then, of the cylindrical dial surface to provide readings between the extreme daylight hours which occur at the vernal and autumnal equinoxes. Further, this arrangement permits viewing of the dial surface from any position around the dial. By making the dial surface 12 relatively broad, the angular displacement of the sun north and south of the equator may be utilized to determine the date of the year as well as the time correction factor, the bead shadow being the display used for this purpose. By using the split calendar grids "a" through "i" and "a'" through "i'", the lower bead 28 is used for the morning hours and the upper bead 30 for the afternoon hours. There is enough separation between the two groups of grid lines to prevent any confusion therebetween.

While there have been described above the principles of this invention in connection with specific apparatus, it is to be clearly understood that this description is made only by way of example and not as a limitation to the scope of the invention.

What is claimed is:

1. A sundial comprising a dial surface and an elongated, rod-like gnomon fixedly secured in operative relation thereto, said surface having an upward curvature outwardly from the central portion as developed from a flat plane about a given axis, said gnomon paralleling said axis, said surface between its ends extending transversely of said gnomon at an obtuse angle therewith, whereby the opposite end portions of said surface are offset in a direction parallel to said axis, and spaced time lines on said surface parallel to said axis.

2. The sundial of claim 1 wherein said dial surface is part cylindrical with said gnomon being located on the cylinder axis.

3. The sundial of claim 2 wherein said dial surface is a helical portion of a cylinder.

4. The sundial of claim 1 wherein said gnomon and said axis substantially parallel the earth's axis of rotation which thereby exposes said dial surface to the sun, the longitudinal extent of said surface being at an obtuse angle with respect to said gnomon that disposes the opposite end portions of such surface such that neither casts a shadow on the dial surface.

5. The sundial of claim 3 wherein said gnomon and said axis substantially parallel the earth's axis of rotation which exposes said dial surface to the sun, the opposite end portions of said surface being offset such that neither casts a shadow on the dial surface.

6. The sundial of claim 5 wherein the opposite end portions of the dial surface substantially lie in a plane perpendicular to a plane defined by the gnomon and the earth's axis of rotation.

7. The sundial of claim 1 including a solar date and time-correction bead on said gnomon disposed in shadow-casting relation to said dial surface, and an elongated calendar chart transversely arranged on said dial surface in operative registry with the shadow of said bead.

8. The sundial of claim 1 including a solar date and time-correction bead on said gnomon disposed in shadow-casting relation to said dial surface, and an elongated time-correction chart transversely arranged on said dial surface in operative registry with the shadow of said bead.

9. The sundial of claim 5 wherein said time lines are evenly spaced apart and including two solar date and time-correction beads spaced apart on said gnomon in shadow-casting relation to said dial surface, two elongated calendar and time-correction charts transversely arranged on said dial surface on opposite sides, respectively, of a noon hour time line disposed intermediate the ends of said dial surface, said two beads being spaced apart such that they cast shadows independently on the forenoon and afternoon portions of said dial surface in registry with said two charts, respectively, said dial surface having a minimum width corresponding to the distance between two shadows of said bead cast at the summer and winter solstices, the chart lengths equaling said distance.

10. The sundial of claim 7 wherein said chart includes time-correction indicia, said chart having spaced length segments corresponding to different months of the year and longitudinally spaced indicia of time corrections according to the equation of time.

11. The sundial of claim 9 wherein each chart has spaced length segments corresponding to the different months of the year and spaced indicia of time correction according to the equation of time.

12. The sundial of claim 11 wherein each chart has two parallel longitudinally extending sides divided into said segments, the segments on one chart side being indicative of portions of the months of July through November, the opposite side the months January through May and the ends marked by the months of June and December, respectively.

13. The sundial of claim 12 wherein the time-correction indicia are provided in spaced relation on the chart sides, respectively.

14. The sundial of claim 13 wherein said dial surface has spaced parallel grid lines at right angles to the plane defined by said gnomon and the earth's axis of rotation, said grid lines intersecting said charts for relating the shadows of said beads to respective positions on said charts.

* * * * *

UNITED STATES PATENT AND TRADEMARK OFFICE
CERTIFICATE OF CORRECTION

PATENT NO. : 4,355,470
DATED : October 26, 1981
INVENTOR(S) : Timothy E. Doyle

It is certified that error appears in the above—identified patent and that said Letters Patent is hereby corrected as shown below:

Column 3, Line 63 change "e" to --e'--.

Signed and Sealed this

*Fifteenth* Day of *February 1983*

[SEAL]

*Attest:*

GERALD J. MOSSINGHOFF

*Attesting Officer* *Commissioner of Patents and Trademarks*